US011118714B2

United States Patent
Menon et al.

(10) Patent No.: US 11,118,714 B2
(45) Date of Patent: Sep. 14, 2021

(54) PIPING SYSTEM

(71) Applicant: SHELL OIL COMPANY, Houston, TX (US)

(72) Inventors: Raghunath Gopal Menon, Katy, TX (US); Juan Pablo Pontaza, Katy, TX (US)

(73) Assignee: SHELL OIL COMPANY, Houston, TX (US)

(*) Notice: Subject to any disclaimer, the term of this patent is extended or adjusted under 35 U.S.C. 154(b) by 0 days.

(21) Appl. No.: 16/322,348

(22) PCT Filed: Jul. 26, 2017

(86) PCT No.: PCT/EP2017/068896
§ 371 (c)(1),
(2) Date: Jan. 31, 2019

(87) PCT Pub. No.: WO2018/024577
PCT Pub. Date: Feb. 8, 2018

(65) Prior Publication Data
US 2019/0195410 A1 Jun. 27, 2019

(30) Foreign Application Priority Data

Aug. 2, 2016 (EP) ..................... 16182316

(51) Int. Cl.
*F15D 1/02* (2006.01)
*F16L 55/04* (2006.01)
(Continued)

(52) U.S. Cl.
CPC ........... *F16L 55/041* (2013.01); *F16L 41/086* (2013.01); *F16L 55/02718* (2013.01)

(58) Field of Classification Search
CPC .. F16L 55/041; F16L 41/086; F16L 55/02718
(Continued)

(56) References Cited

U.S. PATENT DOCUMENTS 1,844,108 A * 2/1932 Smythe .................. G10K 11/02
29/896.2
1,915,867 A * 6/1933 Penick .............. F16L 55/02736
138/42
(Continued)

FOREIGN PATENT DOCUMENTS

EP 1243840 A1 9/2002
JP S59194194 A 11/1984
(Continued)

OTHER PUBLICATIONS

International Search Report and Written Opinion received for PCT Patent Application No. PCT/EP2017/068896, dated Oct. 18, 2017, 10 pages.
(Continued)

*Primary Examiner* — James F Hook
(74) *Attorney, Agent, or Firm* — Shell Oil Company

(57) ABSTRACT

The present invention provides a piping system (1) at least comprising a main pipeline (2) and a side branch pipeline (3), wherein the side branch pipeline (3) meets the main pipeline (2) at a junction (4), wherein the side branch pipeline (3) is provided with a perforated plate (5) having a plurality of perforations (6), wherein the perforated plate (5) has a downstream half (5B) and an upstream half (5A) (relative to the flow direction in the main pipeline (2)), wherein the downstream half (5B) has less open area than the upstream half (5A), and wherein the perforated plate (5) is provided with a protrusion (8), at the side of the perforated plate (5) facing away from the junction (4).

20 Claims, 2 Drawing Sheets

Figure 1:
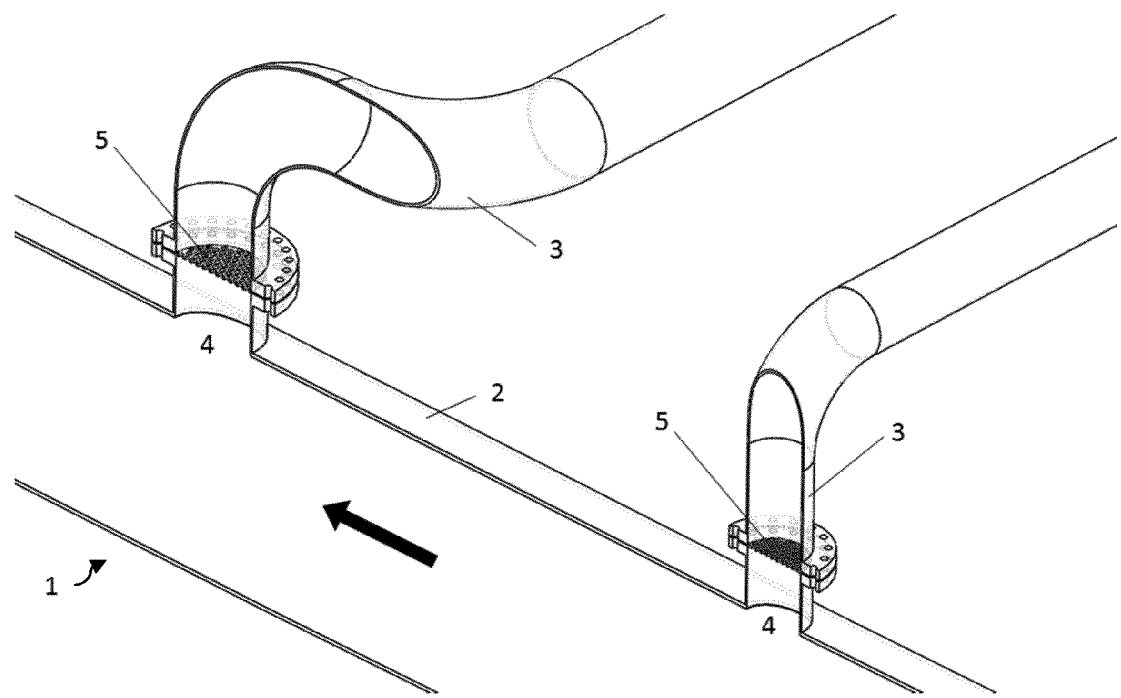

(51) Int. Cl.
*F16L 41/08* (2006.01)
*F16L 55/027* (2006.01)

(58) Field of Classification Search
USPC .............................................. 138/39, 44, 42
See application file for complete search history.

(56) References Cited

U.S. PATENT DOCUMENTS

| | | | | |
|---|---|---|---|---|
| 2,249,469 | A * | 7/1941 | Gray | F16L 41/02 138/40 |
| 2,645,463 | A * | 7/1953 | Stearns | B01F 5/0403 366/158.5 |
| 2,689,017 | A * | 9/1954 | Schmid | E04D 13/0409 210/164 |
| 3,253,401 | A * | 5/1966 | Wells | F01N 3/30 60/298 |
| 3,398,765 | A * | 8/1968 | Oshima | G01F 15/00 138/39 |
| 3,983,903 | A * | 10/1976 | Kuehn, Jr. | F16L 55/02718 138/40 |
| 4,434,814 | A * | 3/1984 | Usry | H01F 27/402 138/40 |
| 4,478,516 | A * | 10/1984 | Kessler | B01F 5/0682 366/87 |
| 4,514,095 | A * | 4/1985 | Ehrfeld | F16L 55/02718 138/42 |
| 4,867,190 | A | 9/1989 | Jungowski et al. | |
| 6,186,179 | B1 * | 2/2001 | Hill | F15D 1/0005 138/39 |
| 6,520,767 | B1 * | 2/2003 | Ahern | F02M 25/0228 239/427 |
| 6,745,886 | B1 * | 6/2004 | Rey | F16L 55/041 192/109 F |
| 10,704,574 | B2 * | 7/2020 | Liang | F15D 1/0005 |
| 2002/0104573 | A1 * | 8/2002 | Raftis | E03F 5/102 138/41 |
| 2005/0205147 | A1 * | 9/2005 | Sawchuk | F15D 1/02 138/39 |
| 2008/0018103 | A1 | 1/2008 | Laib | |
| 2008/0037366 | A1 * | 2/2008 | Smith | G01F 15/00 366/337 |
| 2011/0174408 | A1 * | 7/2011 | Lundberg | B01F 5/0602 138/39 |
| 2012/0206011 | A1 | 8/2012 | Longoni et al. | |
| 2013/0199649 | A1 * | 8/2013 | Fitzgerald | G05D 7/0186 138/44 |
| 2015/0083262 | A1 * | 3/2015 | Van Buskirk | F16L 55/02718 138/40 |
| 2016/0201836 | A1 | 7/2016 | Futatsugi et al. | |
| 2016/0290373 | A1 * | 10/2016 | Suganuma | F23C 5/32 |

FOREIGN PATENT DOCUMENTS

| | | |
|---|---|---|
| JP | H07301386 A | 11/1995 |
| JP | H0814469 A | 1/1996 |
| JP | 2000205068 A | 7/2000 |
| JP | 2008256130 A | 10/2008 |
| WO | 0125546 A1 | 4/2001 |
| WO | 2016059426 A1 | 4/2016 |

OTHER PUBLICATIONS

Takahashi et al., "Flow-induced vibrations in closed side branch pipes and their attenuation methods", Journal of Nuclear Science and Technology, vol. 53, Issue No. 8, Nov. 10, 2015, pp. 1164-1177.
Tonon et al., "Aeroacoustics of pipe systems with closed branches", International Journal of Aeroacoustics, vol. 10, Issue No. 2&3, 2011, pp. 201-275.

* cited by examiner

PIPING SYSTEM

CROSS REFERENCE TO RELATED APPLICATIONS

This is a national stage application of International Application No. PCT/EP2017/068896, filed 26 Jul. 2017, and claims benefit of European Application No. 16182316.6, filed 2 Aug. 2016.

The present invention relates to a piping system, in particular for transporting gas and/or liquid, at least comprising a main pipeline and a side branch pipeline, wherein the side branch pipeline meets the main pipeline at a junction.

A known problem with piping systems is that flow-induced vibrations of side branch pipelines may occur due to flow-excited acoustic resonance. This problem is particularly pertinent in the case where no through-flow occurs in the side branch pipeline, e.g. the side branch pipeline is a 'dead leg' as is the case for relief valve (RV) piping.

If not mitigated, piping vibrations may lead to side branch pipeline fatigue failures due to stress cycling. Side branch pipeline vibrations may increase as the flow rate increases, which may force production restrictions (such as production deferment) to ensure that vibration levels are within acceptable limits for safe operation.

Several approaches for suppressing flow-induced vibrations in side branch pipelines have been suggested. Examples of such approaches have been given in:

D. Tonon et al., "Aeroacoustics of pipe systems with closed branches", International Journal of Aeroacoustics, Volume 10, pages 201-276, 2011;
S. Takahashi et al., "Flow-induced vibrations in closed side branch pipes and their attenuation methods", Journal of Nuclear Science and Technology, published online on 10 Nov. 2015; and
U.S. Pat. No. 4,867,190.

US20080018103 relates to controlling the air flow through lightweight aircraft ducting.

US20120206011 relates to nuclear power plants and in particular to a system for mitigating potentially damaging noise and vibration caused by the excitation of standing waves in closed side branches of a nuclear reactor system.

JP2008256130 (abstract) discloses a fluid pipe.

EP1243850A1 relates to a water piping arrangement, in particular for avoiding adverse effects based on a thermal stratification which is formed by a cavity flow which is generated in a closed pipe branched from a main pipe.

There is a continuous desire to provide alternative approaches to suppress flow-induced vibrations. Further, a problem with some known approaches for suppressing flow-induced vibrations is that the implementation thereof is impractical or requires significant modifications to the piping layout.

It is an object of the present invention to meet the above desire and provide an alternative approach to suppress flow-induced vibrations.

It is a further object to provide an alternative approach to suppress flow-induced vibrations that does not require significant modifications to the piping layout.

It is an even further object of the present invention to provide an approach to suppress flow-induced vibrations that is suitable for large diameter piping applications (such as used in LNG).

One or more of the above or other objects can be achieved by providing a piping system at least comprising a main pipeline and a side branch pipeline, wherein the side branch pipeline meets the main pipeline at a junction, wherein the side branch pipeline is provided with a perforated plate having a plurality of perforations, wherein the perforated plate has a downstream half and an upstream half (relative to the flow direction in the main pipeline), wherein the downstream half has less open area than the upstream half, and wherein the perforated plate is provided with a protrusion, at the side of the perforated plate facing away from the junction.

It has surprisingly been found according to the present invention that the use of a perforated plate having a plurality of perforations in the side branch pipeline allows for a significant reduction of flow-induced vibrations.

A further advantage of the present invention is that it is also suitable for large diameter piping applications. In fact, the present invention is in particular suitable for piping systems with side branch pipelines diameters having a nominal pipe size (NPS) of at least 10 inch, as the size of the perforations may then be designed and shaped such that these perforations are unlikely to plug, especially for 'clean services' (when the flow through the piping system is substantially free of solid impurities that may otherwise potentially plug the perforations of the perforated plate).

Another advantage of the present invention is that it does not require significant modifications to the layout of the piping system. Also, the perforated plate is easy to manufacture and install, and the size and shape of perforations can be designed to meet the desired relief pressure drop constraints (such as for RV piping in relief conditions) and to ensure that the likelihood of the perforations being plugged is low.

Without wanting to be bound to any specific theory, it is believed that the present invention weakens the excitation velocity into the side branch line and attenuates acoustic pressure waves propagating into and out of the side branch pipeline. It is believed that the resulting net effect is that vibrations in the side branch pipeline are mitigated by virtue of de-tuning the flow-excitation frequency and the acoustic resonant frequency of the side branch pipeline.

The person skilled in the art will readily understand that the piping system, as well as the main pipeline and the side branch line, are not limited in any way. It goes without saying that the piping system may comprise two or more side branch lines.

Although not limited thereto, the present invention is particularly suited for large diameter applications.

Further, it is preferred that the side branch pipeline is closed at the end not meeting at the junction, i.e. the side branch pipeline is so-called 'dead leg'. Of course, the piping system may have two or more side branch pipelines (with the same or different pipe diameters), wherein some are open-ended whilst some are closed.

The person skilled in the art will readily understand that the perforated plate is not limited in any way. Typically it will be made from a pressure-resilient material such as metal, ceramic, or the like. The plurality of perforations may be selected from various shapes and sizes and may be arranged in a pattern (such as a triangular pitch) or somewhat random.

Preferably, the perforated plate is arranged substantially perpendicular to the longitudinal axis of the side branch pipeline. In this context, 'substantially perpendicular' means at an angle of between 80° and 100° relative to the longitudinal axis of the side branch pipeline, more preferably between 85° and 95°. Most preferably the perforated plate is arranged at an angle of 90° relative to the longitudinal axis of the side branch pipeline, for purposes of ease of installation.

According to a preferred embodiment of the present invention, the percentage of open area in the perforated plate is between 25% and 75%, preferably at least 30%, more preferably at least 35% and preferably at most 60%, more preferably at most 50%.

Preferably, the perforated plate is placed at a distance of 0 to 15 side branch pipeline diameters from the junction, preferably 0 to 10, more preferably 0 to 5.

As mentioned above, according to the present invention the perforated plate is provided with a protrusion, at the side of the perforated plate facing away from the junction. The person skilled in the art will readily understand that the shape and size of the protrusion is not particularly limited. Preferably the protrusion is ridge-like. Typically, the protrusion is in the downstream half of the plate. Further, in case the protrusion is in the form of a ridge, the protrusion is arranged at an angle of between 90° and 30° relative to the longitudinal axis of the installed perforated plate.

Also, it is preferred that the protrusion divides the perforated plate into a zone with perforations and a zone free of perforations.

In a further aspect, the present invention provides a perforated plate as described in the piping system according to the present invention, wherein the perforated plate has a plurality of perforations and wherein the perforated plate is provided with a protrusion.

As mentioned above, it is preferred that the percentage of open area in the perforated plate is between 25% and 75%, preferably at least 30%, more preferably at least 35% and preferably at most 60%, more preferably at most 50%.

A mentioned above, according to the present invention the perforated plate is provided with a protrusion. Preferably, the protrusion divides the perforated plate into a zone with perforations and a zone free of perforations.

In a further aspect, the present invention provides the use of the piping system or the perforated plate according to the present invention for the suppression of flow-induced vibrations, in particular in a piping system at least comprising a main pipeline and a side branch pipeline (which is preferably closed at the end facing away from the junction).

Figure 2:
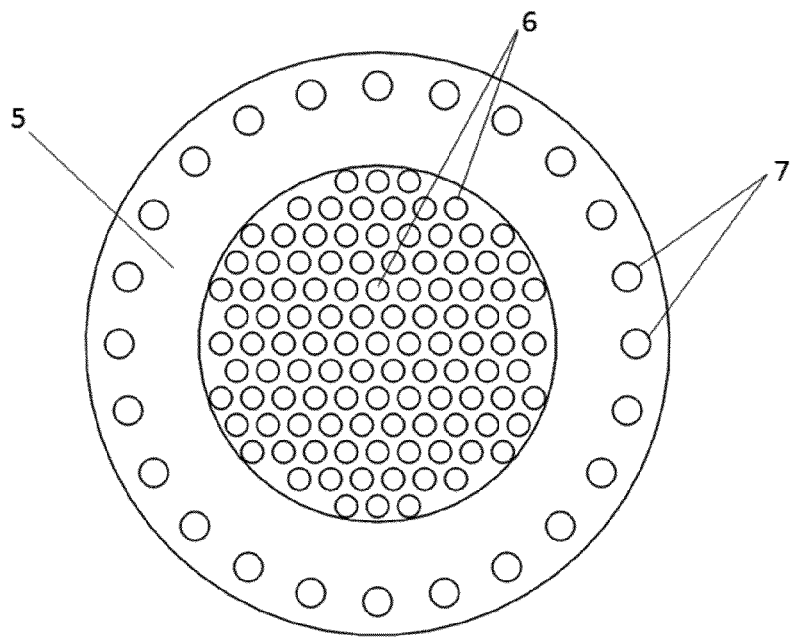
Figure 3:
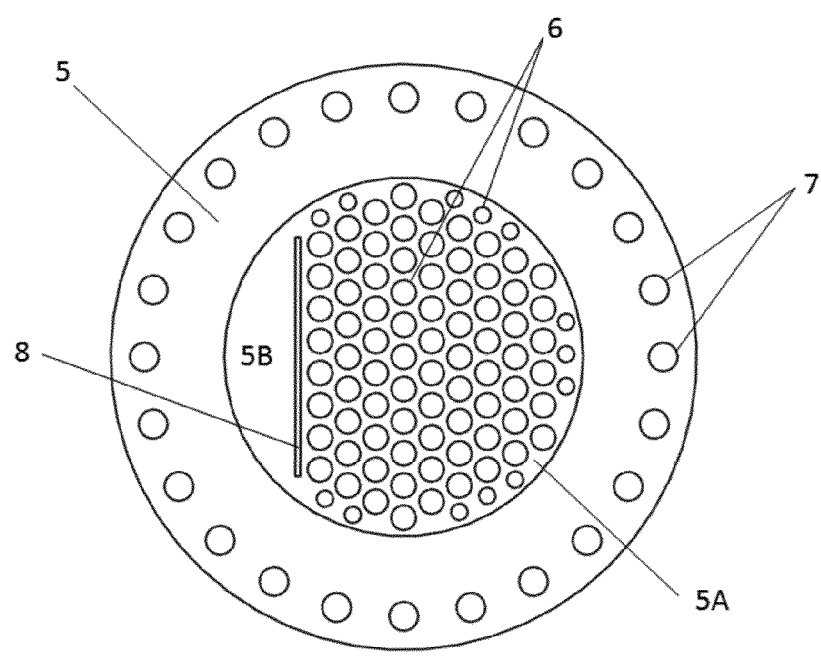

Hereinafter the present invention will be further illustrated by the following non-limiting drawings. The same reference numbers refer to the same or similar components. Herein shows:

FIG. 1 schematically a cross-sectional view of a piping system according to the present invention;

FIG. 2 a perspective view of a perforated plate (not according to the present invention but included for further illustration of the present invention); and FIG. 3 a perspective view of an embodiment of a perforated plate according to present invention.

FIG. 1 shows a cross-sectional view of a piping system generally referred to with reference number 1. The piping system 1 comprises a main pipeline 2 with a NPS (nominal pipe size) diameter of 48 inch, two side branch pipelines 3 (one with an NPS diameter of 12 inch and one with an NPS diameter of 18 inch), a junction 4 and a perforated plate 5 having a plurality of perforations. The side branch pipelines 3 meet the main pipeline 2 at the respective junctions 4. In the embodiment of FIG. 1, the side branch pipelines 3 are closed at the respective ends not meeting at the junctions 4. The perforated plates 5 are placed at a distance from the junction 4 of 0.95 and 0.70 side branch pipeline diameters, respectively for the upstream located (12 inch NPS) side branch pipeline and the downstream located (18 inch NPS) side branch pipeline.

The flow direction in the main pipeline 2 (which also defines the above-mentioned relative upstream and downstream location of the side branch pipelines) has been indicated by means of an arrow.

FIGS. 2-3 show two distinct embodiments of the perforated plate 5. It appeared that—in operation—the perforated plate of FIG. 3 resulted in significant reduction of pipe vibrations when compared with the perforated plate of FIG. 2.

In the embodiment of FIG. 2 (which is not according to the present invention), the perforated plate 5 has a regular pattern of perforations 6 arranged in a triangular pitch. In addition to the perforations 6, flanging bolt holes 7 are shown. The perforated plate 5 of FIG. 2 has an open area of 42% (whilst ignoring the open space as provided by the flanging bolt holes 7, as these latter holes 7 do not add to the open area when installed in the side branch pipeline 3).

In the embodiment of FIG. 3 according to the present invention, the perforated plate 5 has an open area of 42% (again, whilst ignoring the open space as provided by the flanging bolt holes 7). Further, the perforated plate 5 of FIG. 3 is provided with a protrusion 8 (when installed in the piping system 1 at the side of the perforated plate 5 facing away from the junction 4). In the embodiment of FIG. 3, the protrusion 8 is in the form of a ridge which divides the perforated plate 5 into a zone 5A with perforations 6 and a zone 5B free of perforations. When installed in the piping system 1, zone 5B is downstream of zone 5A relative to the flow direction in the main pipeline 2.

The person skilled in the art will readily understand that many modifications may be made without departing from the scope of the invention.

That which is claimed is:

1. A piping system configured to transport one or more of a liquid and a gas and at least comprising a main pipeline and a side branch pipeline, wherein the side branch pipeline meets the main pipeline at a junction,
    wherein the side branch pipeline is provided with a perforated plate having a plurality of perforations, each of the plurality of perforations permitting flow of the one or more of the liquid and the gas through the plurality of perforations and the junction,
    wherein the perforated plate comprises a protrusion at a side of the perforated plate facing away from the junction and configured to divide the perforated plate into a downstream half and an upstream half relative to a flow direction in the main pipeline, and
    wherein the downstream half has less open area than the upstream half.

2. The piping system according to claim 1, wherein the side branch pipeline is closed at the end not meeting at the junction.

3. The piping system according to claim 1, wherein the perforated plate is arranged substantially perpendicular to the longitudinal axis of the side branch pipeline.

4. The piping system according to claim 1, wherein a percentage of open area in the perforated plate is between 25% and 75%.

5. The piping system according to claim 4, wherein one of:
    the percentage of open area in the perforated plate is at least 30%,
    the percentage of open area in the perforated plate is at least 35%, the percentage of open area in the perforated plate is at most 50%, and
the percentage of open area in the perforated plate is at most 60%.

6. The piping system according to claim 1, wherein the perforated plate is placed at a distance of 0 to 15 side branch pipeline diameters from the junction.

7. The piping system according to claim 6, wherein the perforated plate is placed at a distance of 0 to 10 side branch pipeline diameters from the junction.

8. The piping system according to claim 6, wherein the perforated plate is placed at a distance of 0 to 5 side branch pipeline diameters from the junction.

9. The piping system according to claim 1, wherein the protrusion divides the perforated plate into a zone with perforations and a zone free of perforations.

10. The piping system according to claim 1, wherein the piping system suppresses flow-induced vibrations.

11. The piping system according to claim 1,
a second side branch pipeline, wherein the side branch pipeline meets the main pipeline at a second junction,
wherein the second side branch pipeline is provided with a perforated plate having a plurality of perforations, each of the plurality of perforations permitting flow of the one or more of the liquid and the gas through the second junction,
wherein the perforated plate comprises a protrusion at a side of the perforated plate facing away from the second junction and configured to divide the perforated plate into a downstream half and an upstream half relative to a flow direction in the main pipeline, and
wherein the downstream half has less open area than the upstream half.

12. The piping system according to claim 11, wherein:
the side branch pipeline is open ended, and
the second side branch pipeline is a dead leg.

13. The piping system according to claim 11, wherein:
the side branch pipeline is a dead leg, and
the second side branch pipeline is a dead leg.

14. The piping system according to claim 11, wherein
the side branch pipeline is open ended, and
the second side branch pipeline is a dead leg.

15. A perforated plate used in a side branch pipeline of a piping system configured to transport one or more of a liquid and a gas, wherein the side branch pipeline is configured to intersect a main branch pipeline at a junction, the perforated plate comprising:
a plurality of perforations, each of the plurality of perforations permitting flow of the one or more of the liquid and the gas through the plurality of perforations and the junction; and
a protrusion provided at a side of the perforated plate facing away from the junction and configured to divide the perforated plate into a downstream half and an upstream half relative to a flow direction in the main branch pipeline, wherein the downstream half has less open area than the upstream half.

16. The perforated plate according to claim 15, wherein a percentage of open area in the perforated plate is between 25% and 75%.

17. The perforated plate according to claim 16, wherein one of:
the percentage of open area in the perforated plate is at least 30%, and
the percentage of open area in the perforated plate is at least 35%.

18. The perforated plate according to claim 16, wherein the percentage of open area in the perforated plate is at most 50%.

19. The perforated plate according to claim 16, wherein the percentage of open area in the perforated plate is at most 60%.

20. The perforated plate according to claim 15, wherein the protrusion divides the perforated plate into a zone with perforations and a zone free of perforations.

* * * * *